(12) United States Patent
Koti et al.

(10) Patent No.: US 9,736,381 B2
(45) Date of Patent: Aug. 15, 2017

(54) PICTURE IN PICTURE RECORDING OF MULTIPLE REGIONS OF INTEREST

(71) Applicant: Intel Corporation, Santa Clara, CA (US)

(72) Inventors: Sreenidhi A. Koti, Bangalore (IN); Manoj Gopalakrishnan, Bangalore (IN); Rohit K. Choraria, Bangalore (IN); Prasanna Krishnaswamy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 14/700,497

(22) Filed: Apr. 30, 2015

(65) Prior Publication Data

US 2015/0350554 A1 Dec. 3, 2015

(30) Foreign Application Priority Data

May 30, 2014 (IN) .......................... 2656/CHE/2014

(51) Int. Cl.
*H04N 5/232* (2006.01)
*H04N 5/247* (2006.01)
*G06K 9/00* (2006.01)
*G06F 3/041* (2006.01)
*G06T 7/00* (2017.01)
*H04N 5/225* (2006.01)

(52) U.S. Cl.
CPC ....... *H04N 5/23293* (2013.01); *H04N 5/2258* (2013.01); *H04N 5/23219* (2013.01); *H04N 5/23229* (2013.01)

(58) Field of Classification Search
CPC .......... H04N 5/23219; H04N 5/23229; H04N 5/23293; H04N 5/247; H04N 1/00442; H04N 1/00448; G06K 9/00221; G06T 3/041; G06T 7/0081; H01N 1/00445; G06F 17/30274; G06F 17/30849; G08B 13/19693
USPC ............ 348/47, 48, 153, 159, 211.11, 218.1, 348/333.05, 333.12, 222.1, 240.99, 345, 348/36, 208.14; 382/103, 118, 298
See application file for complete search history.

(56) References Cited

U.S. PATENT DOCUMENTS

| 6,977,676 B1 * | 12/2005 | Sato ................. G08B 13/19628 348/14.08 |
| 7,783,084 B2 * | 8/2010 | Imagawa ........... G06K 9/00228 382/103 |
| 8,184,192 B2 * | 5/2012 | Sakaguchi ......... H04N 5/23212 348/333.05 |
| 8,345,143 B2 * | 1/2013 | Yoshino ............... H04N 1/0035 348/333.02 |

(Continued)

*Primary Examiner* — Tuan Ho
*Assistant Examiner* — Marly Camargo
(74) *Attorney, Agent, or Firm* — Patent Capital Group (57) ABSTRACT

Particular embodiments described herein provide for an electronic device that can include a main camera, at least one array of cameras, and a display to display an image captured by the main camera, wherein the image includes more than one region of interest and each region of interest is displayed in a separate picture in picture image on the display. A stream synchronization process module can capture the image and each separate picture in picture image as a separate video stream or as a single video stream.

14 Claims, 8 Drawing Sheets

(56) References Cited

U.S. PATENT DOCUMENTS

| | | | |
|---|---|---|---|
| 2005/0046730 A1* | 3/2005 | Li | H04N 5/23293 348/333.12 |
| 2008/0186386 A1* | 8/2008 | Okada | H04N 5/23248 348/208.4 |
| 2008/0239092 A1* | 10/2008 | Sugino | G06K 9/00281 348/222.1 |
| 2011/0122308 A1* | 5/2011 | Duparre | H01L 27/14621 348/340 |
| 2011/0249074 A1* | 10/2011 | Cranfill | H04N 7/147 348/14.02 |
| 2012/0206619 A1* | 8/2012 | Nitta | H04N 5/23219 348/222.1 |
| 2013/0155308 A1* | 6/2013 | Wu | G06T 3/00 348/333.05 |
| 2013/0328997 A1* | 12/2013 | Desai | H04N 7/141 348/14.02 |
| 2014/0078241 A1* | 3/2014 | Vaisburd | H04N 7/15 348/14.08 |

\* cited by examiner

PICTURE IN PICTURE RECORDING OF MULTIPLE REGIONS OF INTEREST

CROSS-REFERENCE TO RELATED APPLICATION

This application claims the benefit of priority under 35 U.S.C. §119(e) to 2656/CHE/2014, entitled "PICTURE IN PICTURE RECORDING OF MULTIPLE REGIONS OF INTEREST" filed in the Indian Patent Office on May 30, 2014, which is hereby incorporated by reference in its entirety.

FIELD OF THE DISCLOSURE

Embodiments described herein generally relate to the field of electronic devices, and more particularly, to a picture in picture recording of regions of interest.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF THE EMBODIMENTS

Overview

In an example, there is disclosed a system, an apparatus, and a method for a display rotation detection device. In one example embodiment, an electronic device is provided and includes a main camera, at least one array of cameras, and a display to display an image captured by the main camera, wherein the image includes a region of interest and when the region of interest is selected, a picture in picture image of the region of interest is captured by the at least one array of cameras and displayed on the display as a picture in picture image.

The example may optionally include where the image includes more than one region of interest and each region of interest is displayed in a separate picture in picture image on the display. Further, the example may optionally include a stream synchronization process module to capture the image and each separate picture in picture image as a separate video stream. In addition, the example may optionally include a stream synchronization process module to capture the image and each separate picture in picture image as a single video stream. Also, the example may optionally include where the display is a touch screen display and the region of interest is selected by touching the region of interest. The region of interest can includes a face and the electronic device may further include a facial recognition module to track the face in the image. The region of interest may alternatively include an object and the electronic device may further include an object recognition module to track the object in the image. The electronic device can be a digital camera.

Example Embodiments of the Disclosure

A digital camera is a camera that encodes digital images and videos digitally and stores them for later reproduction. Typical modern digital and film cameras share an optical system that uses a lens with a variable diaphragm to focus light onto an image pickup device. In a digital camera, the diaphragm and shutter admit the correct amount of light to the imager, just as with film, but the image pickup device is electronic rather than chemical. Also, unlike film cameras, digital cameras can display images on a screen immediately after being recorded and store the images in memory. Many to today's digital camera offer some sort of face detection.

Face detection is a computer technology that determines the locations and sizes of human faces in digital images. The process can detect faces and can ignore anything else, such as buildings, trees and bodies. Face detection can be regarded as a specific case of object-class detection. Object class detection is a technology that deals with detecting objects of a certain class (such as humans, buildings, or cars) in digital images and videos.

Current digital cameras do not capture faces or objects in a region of interest (ROI) using an array cameras and a high quality optical zoom. Also, current digital camera are not able to record multiple captured streams as a single composite video or as multiple individual videos. What is needed is a system and method that allows for a digital camera with an array of cameras that includes a high quality optical zoon to capture multiple streams of ROIs as a single composite video or multiple individual videos.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment many have different advantages, and no particular advantage is necessarily required of any embodiment.

In the examples of the present specification, a system and method can be provided that allows for a digital camera with an array of cameras that includes a high quality optical zoon to capture multiple streams of ROIs as a single composite video or multiple individual videos. In one example, a digital camera can be configured to allow a user to select multiple ROIs in a camera preview. The ROIs could be a face or any object. Selection of the ROI can be done through multiple mechanisms, for example using a touch input on a touch screen or a pointing stick to move a cursor on a display to select the ROI. The selected object in the ROI can be tracked and shown using a high quality zoom in picture in picture mode along with the camera preview on a display. The selected ROI(s) along with the entire preview can be recorded as a composited single stream or as individual multiple streams. The main camera continues to capture the entire scene and the array of cameras can automatically focus, zoom and capture the selected ROI(s). The array of cameras can have a mechanical or an optical zoom to provide high quality zoom for the ROI(s).

Example Embodiments

The following detailed description sets forth example embodiments of apparatuses, methods, and systems relating to detection of display rotation mechanisms or devices for an electronic device. Features such as structure(s), function(s), and/or characteristic(s), for example, are described with reference to one embodiment as a matter of convenience; various embodiments may be implemented with any suitable one or more of the described features.

Figure 1:
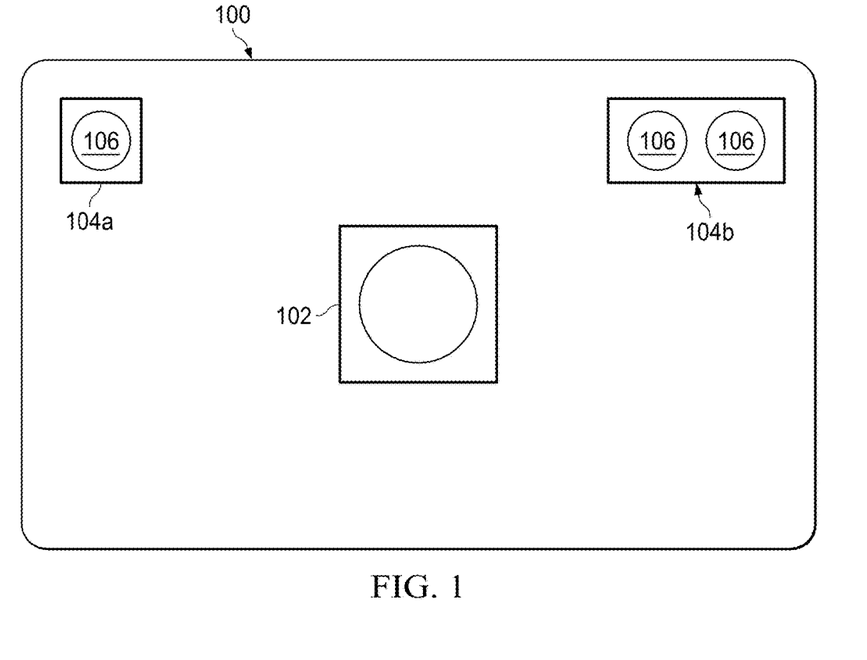
FIG. 1 is a simplified block diagram illustrating an embodiment of an electronic device, in accordance with one embodiment of the present disclosure.

FIG. 1 is a simplified block diagram illustrating an embodiment of an electronic device 100 configured for picture in picture recording of multiple regions of interest in accordance with one embodiment of the present disclosure. In an example, electronic device 100 is a digital camera. Electronic device can include a main camera 102 and one or more array cameras 104a and b. Main camera 102 may be a red, green blue camera. Array cameras 104a and b can each include one or more zoom lenses 106. In an example, array cameras 104a and b do not include a zoom lens and image data acquired by array cameras 104a and b can be optically zoomed.

Figure 2:
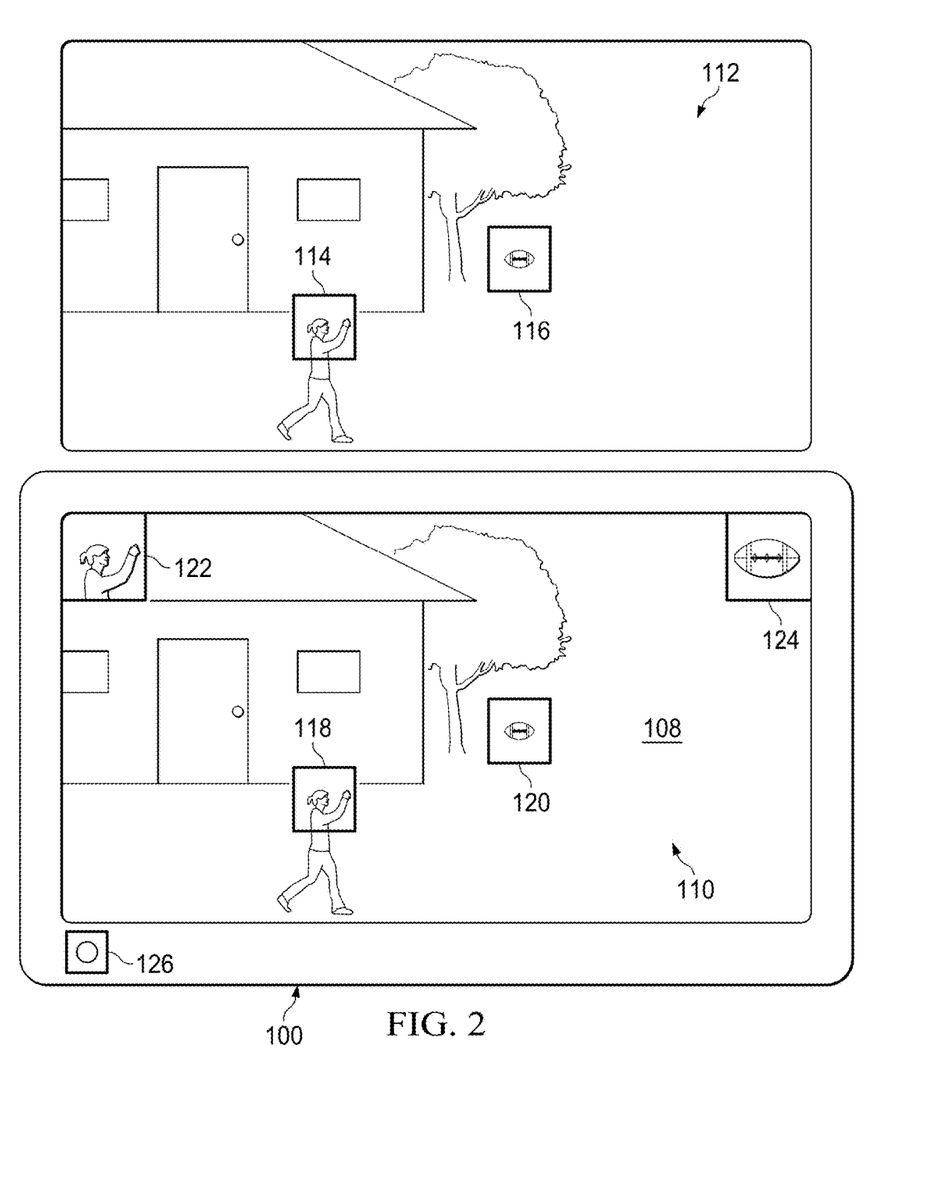
FIG. 2 is a simplified block diagram illustrating an embodiment of an electronic device, in accordance with one embodiment of the present disclosure.

Turning to FIG. 2, FIG. 2 is a simplified block diagram illustrating an embodiment of a picture in picture recording of multiple regions of interest in accordance with one embodiment of the present disclosure. Electronic device 100 may include a display 108. Electronic device 102 may be a digital camera or some other electronic device that can capture a digital image 110 of a scene 112. Scene 112 can include, among other things, a first ROI 114 that includes a face of a person and a second ROI 116 that includes an object such as a football.

Display 108 may be a a liquid crystal display (LCD) display screen, a light-emitting diode (LED) display screen, an organic light-emitting diode (OLED) display screen, a plasma display screen, or any other suitable display screen system. In addition, display 108 may be a touch display. Electronic device 100 can include a battery and various electronics (e.g., wireless module (e.g., Wi-Fi module, Bluetooth module, etc.) processor, memory, camera, a microphone, speakers, etc.). Display 108 can display a digital representation of scene 112, a digital representation of first ROI 118, and a digital representation of second ROI 120.

When digital image 110 is displayed on display 108, digital representation of first ROI 118 may be selected. In one example, digital representation of first ROI 118 may be selected using touch input if display 108 is a touch display. In another example, digital representation of first ROI 118 may be selected using a pointing stick 126 to move a cursor on display 108 and select digital representation of first ROI 118. Pointing stick 126 may be an isometric joystick used as a pointing device to control a cursor on display 108. Pointing stick 126 may also be a trackball, touchpad, external mouse, or some other device that can be used to control a cursor on display 108 and select an ROI displayed on display 108. Once digital representation of first ROI 118 is selected, display 108 can include a picture in picture (PIP) 122 of first ROI 114. Similarly, if digital representation of second ROI 120 is selected, display 108 can additionally include a second PIP 124 of ROI 116. The image displayed in PIP 122 can be captured by camera array 104a (shown in FIG. 1). The image displayed in second PIP 124 can be captured by camera array 104b (shown in FIG. 1).

Electronic device 100 can be configured to allow selection of digital representation of first ROI 118 and digital representation of second ROI 120 (which could be face(s) or object(s)) from display 108 and track first ROI 114 and second ROI 118 using face recognition and object detection algorithms. The image displayed in PIP 122 and second PIP 124 can be acquired using high quality zoom lenses (e.g., zoom lens 106) in camera arrays 104a and b. The images displayed on display 108, in PIP 122 and in second PIP 124 can be recorded as individual video streams or as a single combined video stream. The combined video stream can include digital image 110, a zoomed image displayed in PIP 122, and a zoomed image in second PIP 124.

Figure 3:
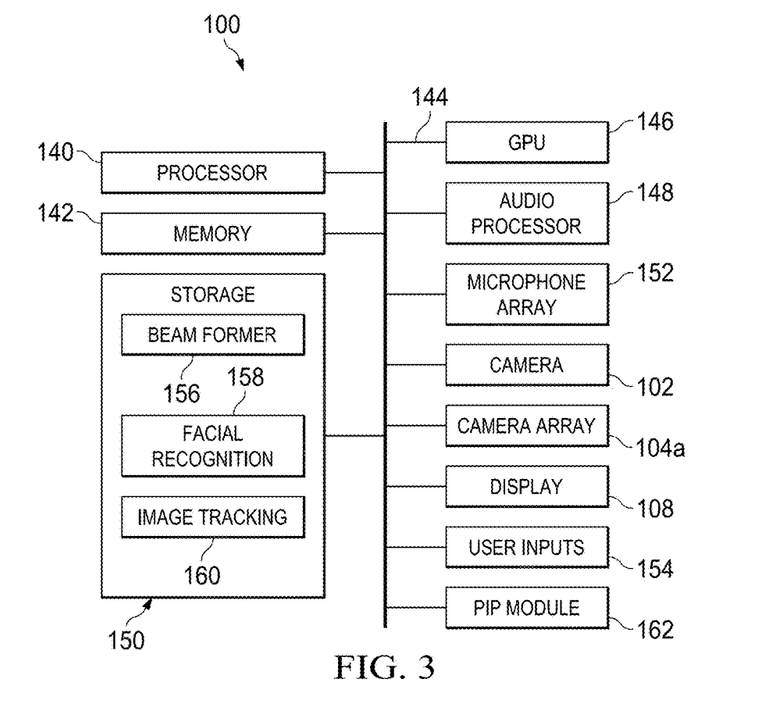
FIG. 3 is a simplified block diagram illustrating an embodiment of an electronic device, in accordance with one embodiment of the present disclosure.

Turning to FIG. 3, FIG. 3 is a simplified block diagram illustrating an embodiment of an electronic device 100 configured for picture in picture recording of multiple regions of interest in accordance with one embodiment of the present disclosure. Electronic device 100 may be, for example, a digital camera, a webcam, laptop computer, tablet computer, mobile phone, smart phone, or a video recorder, among others. Electronic device 100 can include a central processing unit (CPU) 140 that is configured to execute stored instructions, as well as a memory device 142 that stores instructions that are executable by CPU 140. CPU 140 can be coupled to memory device 142 by a bus 144. CPU 140 may be a single core processor, a multi-core processor, a computing cluster, or any number of other configurations. Furthermore, electronic device 100 may include more than one CPU 140. Memory device 142 can include random access memory (RAM), read only memory (ROM), flash memory, or any other suitable memory systems. For example, memory device 142 may include dynamic random access memory (DRAM).

Electronic device 100 may also include a graphics processing unit (GPU) 146. As shown, CPU 140 may be coupled through bus 144 to GPU 146. GPU 146 can be configured to perform any number of graphics operations within electronic device 100. For example, GPU 146 may be configured to render or manipulate graphics images, graphics frames, videos, or the like, to be displayed to a user of electronic device 100.

Electronic device 100 can also include an audio processing device 148. Audio processing device 148 can be configured to perform any number of audio processing operations, such as encoding or decoding audio data, retrieving audio files for rendering the audio on a sound system of electronic device 100, audio equalization, and any other audio processing.

Electronic device 100 can also include a storage device 150. Storage device 150 is a physical memory such as a hard drive, an optical drive, a flash drive, an array of drives, or any combinations thereof. Storage device 150 can store user data, such as audio files, video files, audio/video files, and picture files, among others. Storage device 150 can also store programming code such as device drivers, software applications, operating systems, and the like. The programming code stored to storage device 150 may be executed by CPU 140, GPU 146, audio processor 148, or any other processors that may be included in electronic device 100.

Electronic device 100 can also include a microphone array 152 for capturing audio and camera 102 and camera array 104a for capturing still pictures or video. Microphone array 152 can include any suitable number of microphones, including two, three, four, five microphones or more. Microphone array 152, camera 102, and camera array 104a can be used together to capture synchronized audio/video data, which may be stored to storage device 150 as audio/video files or rendered on display 108. Electronic device 100 can also include one or more user input devices 154 (e.g., tracking module 126), such as switches, buttons, a keyboard, a mouse, or trackball, among others. One of the input devices may be a touchscreen, which may be integrated with display 108. Input devices 154 may be built-in components of electronic device 100, or may be devices that are externally connected to electronic device 100.

The programming code stored to storage device 150 may include a beam former 156, a facial recognition module 158, and an image tracking module 160. In some examples, rather than being implemented as programming code stored to storage device 150, one or more of beam former 156, facial recognition module 158, and image tracking module 160 may be implemented as firmware or logic circuits included in a dedicated processor such as the GPU 146 or audio processor 148.

Beam former 156 controls the directionality of camera array 104a (and 104b) by receiving video signals from individual lenses of camera array 104a and processing the video signals in such a way as to amplify (or zoom in on) certain components of the video signal based on the relative position of selected ROIs.

Facial recognition module 158 enables electronic device 100 to recognize faces in a video signal received by camera 102. In some examples, facial recognition module 158 may identify specific features of a person's face to enable specific people to be identified and tracked as the relative position of different people move through a camera's field of view. Facial recognition module 158 can be used to identify beam forming targets. For example, facial recognition module 158 can highlight people's faces on display 108, and a user can select one or more of the highlighted faces as a ROI (e.g., ROI 118). Highlighting a person's face can include superimposing a box over the user's face or any other technique for drawing attention to a portion of the display. Once a face is selected, PIP module 162 can create a picture in picture on display 108 (e.g., PIP 122 of first ROI 114). Image tracking module 160 enables objects to be tracked as they move through the field of the view of electronic device 100. The movement of the object through the field of view of electronic device 100 can be due to actual movement of the object relative to the environment, or movement of electronic device 100.

The block diagram of FIG. 3 is not intended to indicate that electronic device 100 is to include all of the components shown in FIG. 3. Rather, electronic device 100 can include fewer or additional components not shown in FIG. 3, depending on the details of the specific implementation. Furthermore, any of the functionalities of CPU 140, graphics processor 146, or audio processor 148, may be partially, or entirely, implemented in hardware and/or in a processor. For example, the functionality may be implemented in any combination of Application Specific Integrated Circuit (ASICs), Field Programmable Gate Array (FPGAs), logic circuits, and the like.

Figure 4:
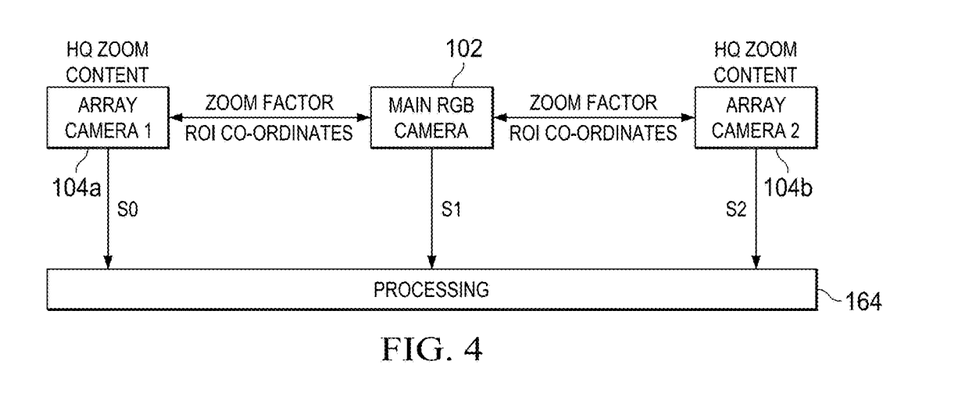
FIG. 4 is a simplified block diagram illustrating an embodiment of an electronic device, in accordance with one embodiment of the present disclosure.

Turning to FIG. 4, FIG. 4 is a simplified block diagram illustrating an electronic device 100 in accordance with one embodiment of the present disclosure. Camera 102 and array cameras 104a and b can be in communication with each other and with a processing unit 164. For example, camera 102 and array cameras 104a and b may communicate desired or current zoom factors, ROI coordinates, or other information or data that may be used for PIP recording of multiple ROIs. Processing unit 164 may be CPU 140, GPU 146, a combination of the two, or some other processor. Processing unit 164 can receive and process video data from camera 102 and array cameras 104a and b.

Array cameras 104a and b can be the source of high quality zoom content of selected ROI(s). The ROI(s) could be multiple faces or objects. Camera 102 can provide a normal or typical camera preview connected to multiple array cameras 104a and b using an Inter-Integrated Circuit (I2C) interface based communication mechanism. Using image tracking module 160, camera 102 can provide ROI co-ordinates and zoom factors to array cameras 104a and b. Zoomed ROI video data from array cameras 104a and b can be recorded as individual video streams (S0,S2) or recorded as a single video stream (S1) along with digital image 112, shown in FIG. 2. Processing unit 164 can be configured to determine if the selected ROI includes a face or an object and can trigger a corresponding algorithm for face recognition or object detection. Both face recognition and object detection can use OPENCV based algorithms for tracking.

Figure 5:
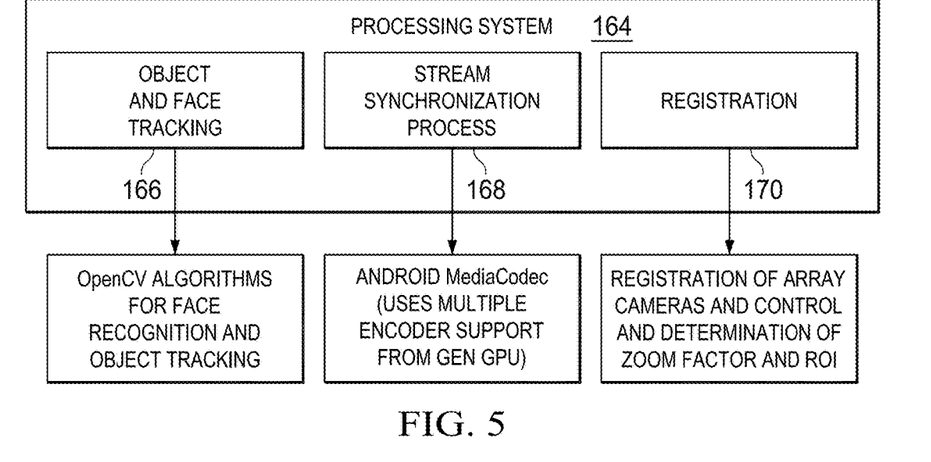
FIG. 5 is a simplified block diagram illustrating an embodiment of a portion of an electronic device, in accordance with one embodiment of the present disclosure.

Turning to FIG. 5, FIG. 5 is a simplified block diagram illustrating processing unit 164 in accordance with one embodiment of the present disclosure. Processing unit 164 can include object and face tracking module 166, stream synchronization process module 168, and registration module 170. Object and face tracking module 166 can be configured to track selected ROIs and can use OPENCV algorithms for face recognition and object tracking. Stream synchronization process module 168 can be configured to record individual streams and handle blitting (i.e., copying bits) for the PIP streams. The individual streams can be zoomed ROIs or the entire preview screen with ROIs in a PIP. In a specific example, stream synchronization process module 168 may use a media codec framework to accelerate the recording path with a GPU. Registration module 170 can be configured to register array cameras 104a and b (and other if present), control the zoom factor, and ROI selection. Registration module 170 can also be configured to handle multiple user input methods such as touch based ROI selection, command based ROI selection, stylus based ROI selection, ROI selection using pointing stick 126, etc.

Figure 6:
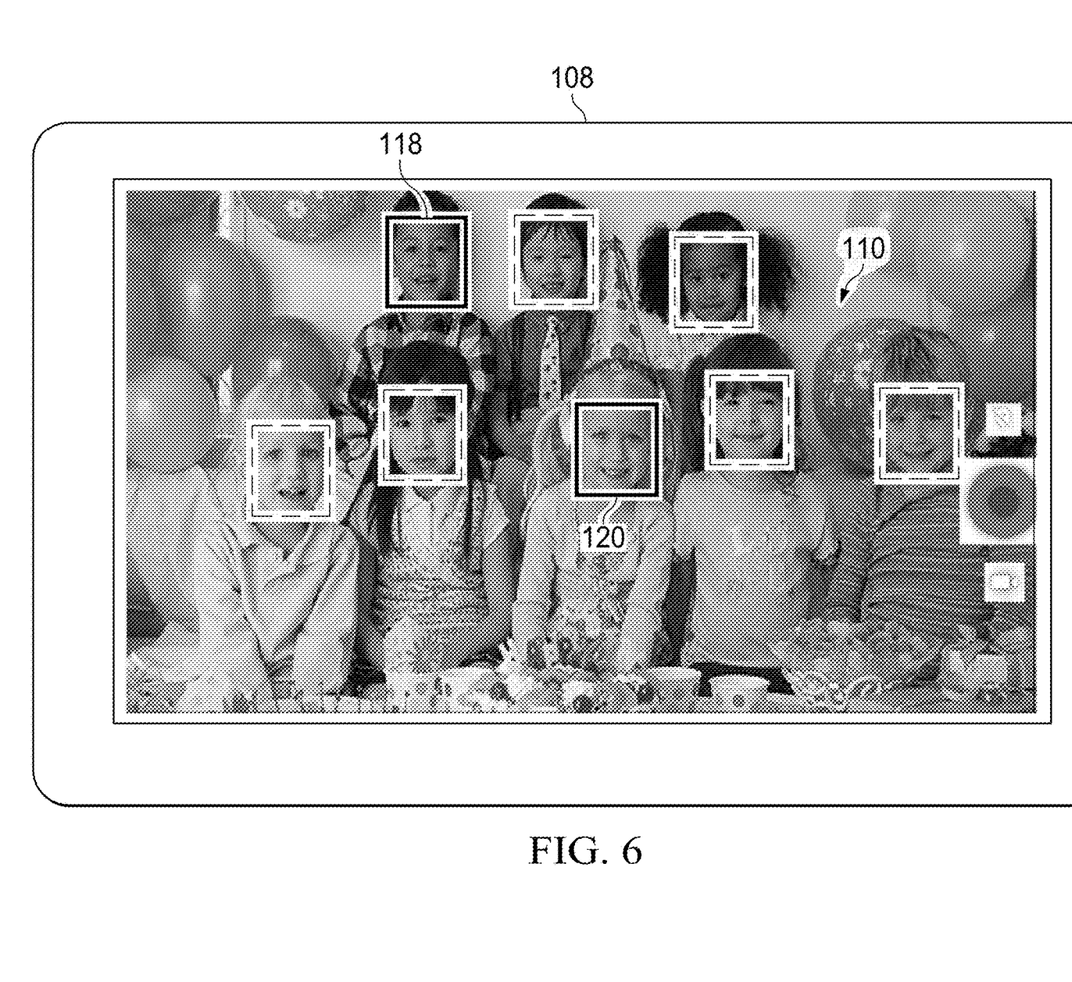
FIG. 6 is a simplified block diagram illustrating an embodiment of a portion of an electronic device, in accordance with one embodiment of the present disclosure.
Figure 7:
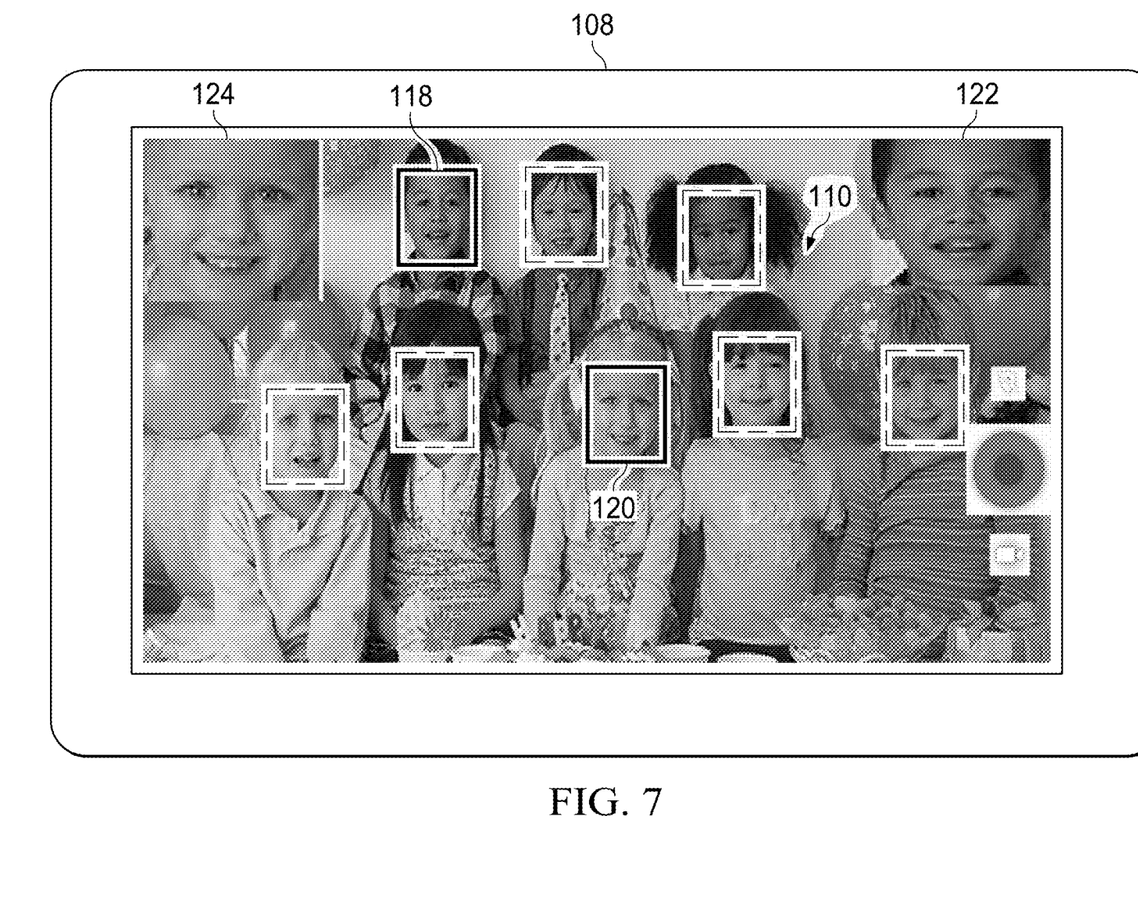
FIG. 7 is a simplified block diagram illustrating an embodiment of an electronic device, in accordance with one embodiment of the present disclosure.

Turning to FIG. 6, FIG. 6 is a simplified illustrative example of display 108. As illustrated in FIG. 6, digital image 110 is displayed on display 108 and people's faces in digital image 110 have been highlighted. For example, facial recognition module 158 may have detected the faces and highlighted each face. In this example, one face is a digital representation of first ROI 118 and a second face is a digital representation of second ROI 120. Turning to FIG. 7, FIG. 7 is a simplified illustrative of example of display 108 with PIP 122 and second PIP 124. After digital representation of first ROI 118 and digital representation of second ROI 120 have been selected (e.g., touching the area of digital representation of first ROI 118 and the area of digital representation of second ROI 120), PIP 122 displays a zoomed image of digital representation of first ROI 118 and second PIP 124 displays a zoomed image of digital representation of second ROI 120.

Figure 8:
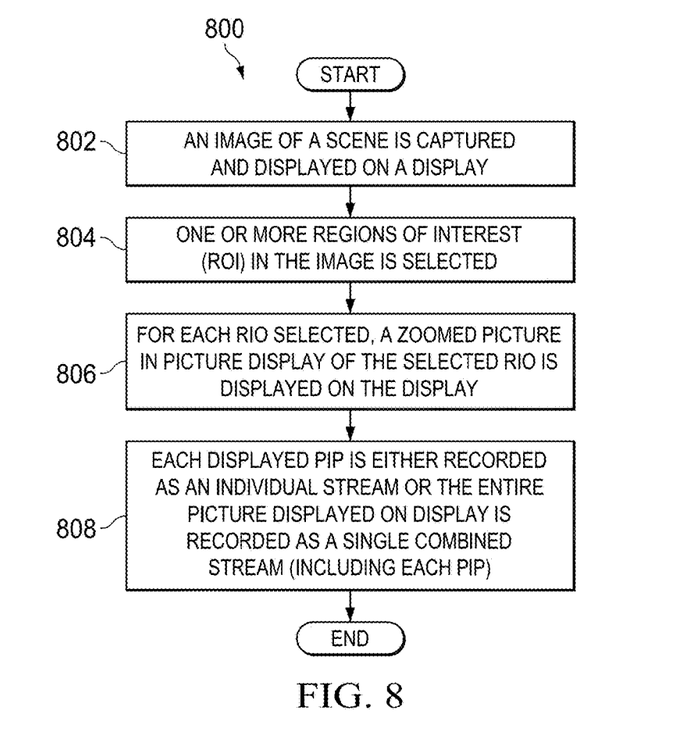
FIG. 8 is a simplified flowchart illustrating potential operations that may be associated with one embodiment of the present disclosure.

Turning to FIG. 8, FIG. 8 is an example flowchart illustrating possible operations of a flow 800 that may be associated with picture in picture recording of multiple regions of interest, in accordance with an embodiment. At 802, an image of a scene is captured and displayed on a display. At 804, one or more ROIs in the image is selected. At 806, for each ROI selected, a zoomed PIP display of the selected ROI is displayed on the display. At 810, each displayed PIP is either recorded as an individual stream or the entire picture displayed on display is recorded as a single combined stream (including each PIP).

Figure 9:
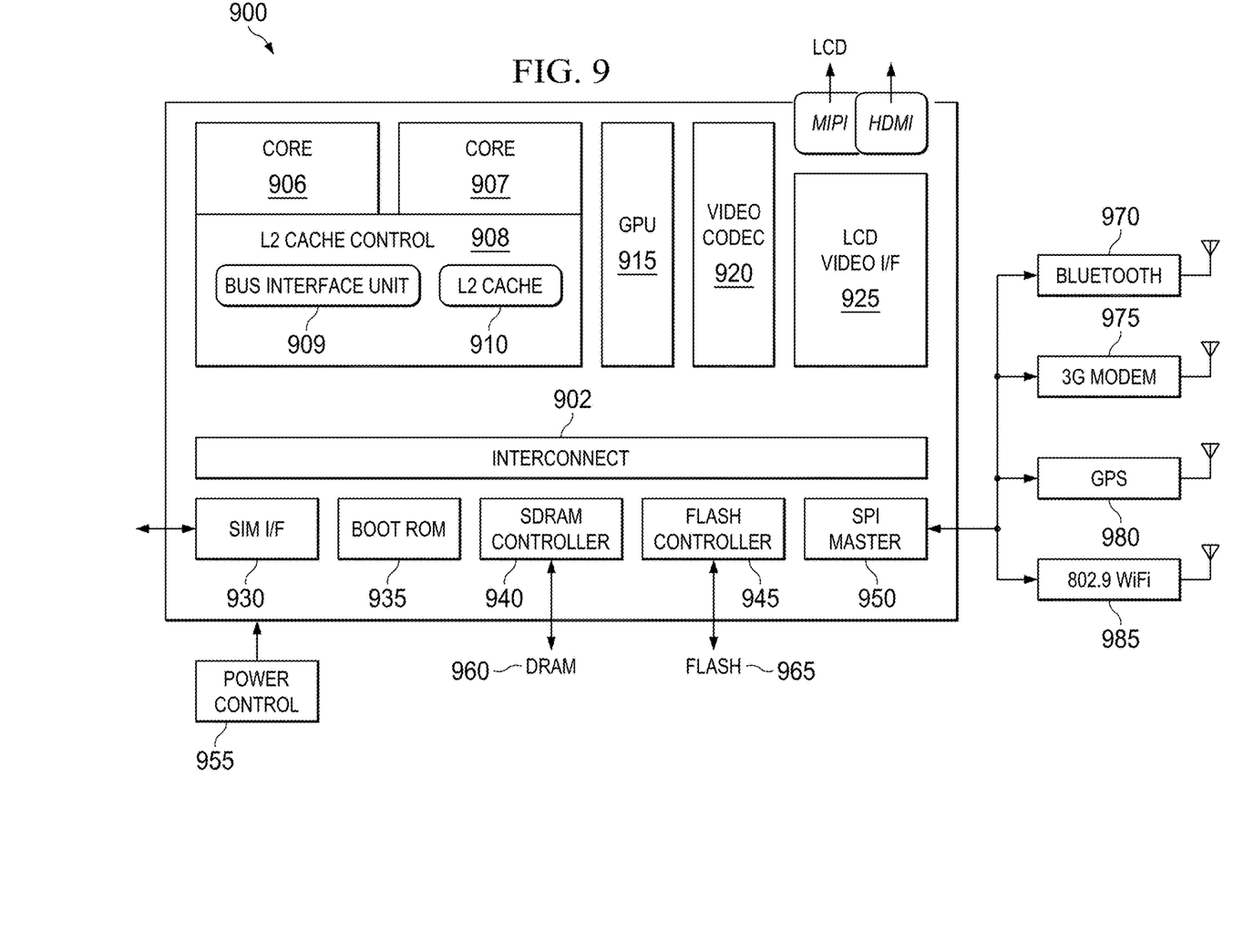
FIG. 9 is a simplified block diagram associated with an example ARM ecosystem system on chip (SOC) of the present disclosure.

Turning to FIG. 9, FIG. 9 is a simplified block diagram associated with an example ARM ecosystem SOC 900 of the present disclosure. At least one example implementation of the present disclosure can include the PIP recording of multiple ROI features discussed herein and an ARM component. For example, the example of FIG. 9 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 9, ARM ecosystem SOC 900 may include multiple cores 906-907, an L2 cache control 908, a bus interface unit 909, an L2 cache 910, a graphics processing unit (GPU) 915, an interconnect 902, a video codec 920, and a liquid crystal display (LCD) I/F 925, which may be associated with mobile industry processor interface (MIPI)/high-definition multimedia interface (HDMI) links that couple to an LCD.

ARM ecosystem SOC 900 may also include a subscriber identity module (SIM) I/F 930, a boot read-only memory (ROM) 935, a synchronous dynamic random access memory (SDRAM) controller 940, a flash controller 945, a serial peripheral interface (SPI) master 950, a suitable power control 955, a dynamic RAM (DRAM) 960, and flash 965. In addition, one or more example embodiments include one or more communication capabilities, interfaces, and features such as instances of Bluetooth™ 970, a 3G modem 975, a global positioning system (GPS) 980, and an 802.11 Wi-Fi 985.

In operation, the example of FIG. 9 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 10:
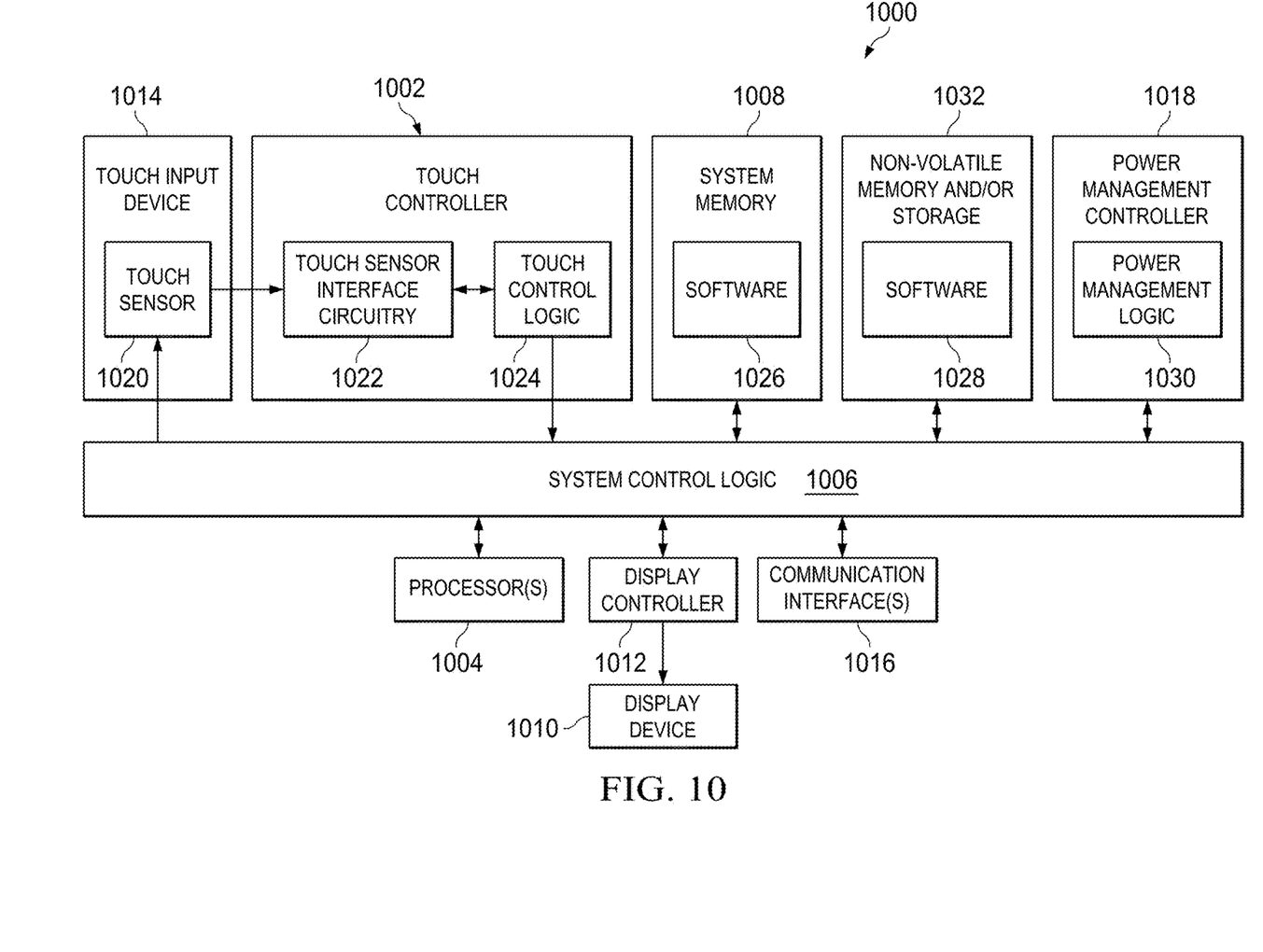
FIG. 10 is a simplified block diagram illustrating example logic that may be used to execute activities associated with the present disclosure.

Turning to FIG. 10, FIG. 10 is a simplified block diagram illustrating potential electronics and logic that may be associated with any of the electronic devices discussed herein. In at least one example embodiment, system 1000 can include a touch controller 1002, one or more processors 1004, system control logic 1006 coupled to at least one of processor(s) 1004, system memory 1008 coupled to system control logic 1006, non-volatile memory and/or storage device(s) 1032 coupled to system control logic 1006, display controller 1012 coupled to system control logic 1006, display controller 1012 coupled to a display device 1010, power management controller 1018 coupled to system control logic 1006, and/or communication interfaces 1016 coupled to system control logic 1006.

System control logic 1006, in at least one embodiment, can include any suitable interface controllers to provide for any suitable interface to at least one processor 1004 and/or to any suitable device or component in communication with system control logic 1006. System control logic 1006, in at least one example embodiment, can include one or more memory controllers to provide an interface to system memory 1008. System memory 1008 may be used to load and store data and/or instructions, for example, for system 1000. System memory 1008, in at least one example embodiment, can include any suitable volatile memory, such as suitable dynamic random access memory (DRAM) for example. System control logic 1006, in at least one example embodiment, can include one or more I/O controllers to provide an interface to display device 1010, touch controller 1002, and non-volatile memory and/or storage device(s) 1032.

Non-volatile memory and/or storage device(s) 1032 may be used to store data and/or instructions, for example within software 1028. Non-volatile memory and/or storage device(s) 1032 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1018 may include power management logic 1030 configured to control various power management and/or power saving functions disclosed herein or any part thereof. In at least one example embodiment, power management controller 1018 is configured to reduce the power consumption of components or devices of system 1000 that may either be operated at reduced power or turned off when the electronic device is in a closed configuration. For example, in at least one example embodiment, when the electronic device is in a closed configuration, power management controller 1018 performs one or more of the following: power down the unused portion of the display and/or any backlight associated therewith; allow one or more of processor(s) 1004 to go to a lower power state if less computing power is required in the closed configuration; and shutdown any devices and/or components that are unused when an electronic device is in the closed configuration.

Communications interface(s) 1016 may provide an interface for system 1000 to communicate over one or more networks and/or with any other suitable device. Communications interface(s) 1016 may include any suitable hardware and/or firmware. Communications interface(s) 1016, in at least one example embodiment, may include, for example, a network adapter, a wireless network adapter, a telephone modem, and/or a wireless modem.

System control logic 1006, in at least one example embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 1004 may be packaged together with logic for one or more controllers of system control logic 1006. In at least one example embodiment, at least one processor 1004 may be packaged together with logic for one or more controllers of system control logic 1006 to form a System in Package (SiP). In at least one example embodiment, at least one processor 1004 may be integrated on the same die with logic for one or more controllers of system control logic 1006. For at least one example embodiment, at least one processor 1004 may be integrated on the same die with logic for one or more controllers of system control logic 1006 to form a System on Chip (SoC).

For touch control, touch controller 1002 may include touch sensor interface circuitry 1022 and touch control logic 1024. Touch sensor interface circuitry 1022 may be coupled to detect touch input over a first touch surface layer and a second touch surface layer of a display (i.e., display device 1010). Touch sensor interface circuitry 1022 may include any suitable circuitry that may depend, for example, at least in part on the touch-sensitive technology used for a touch input device. Touch sensor interface circuitry 1022, in one embodiment, may support any suitable multi-touch technology. Touch sensor interface circuitry 1022, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1024 may be coupled to help control touch sensor interface circuitry 1022 in any suitable manner to detect touch input over a first touch surface layer and a second touch surface layer. Touch control logic 1024 for at least one example embodiment may also be coupled to output in any suitable manner digital touch input data corresponding to touch input detected by touch sensor interface circuitry 1022. Touch control logic 1024 may be implemented using any suitable logic, including any suitable hardware, firmware, and/or software logic (e.g., non-transitory tangible media), that may depend, for example, at least in part on the circuitry used for touch sensor interface circuitry 1022. Touch control logic 1024 for at least one embodiment may support any suitable multi-touch technology.

Touch control logic 1024 may be coupled to output digital touch input data to system control logic 1006 and/or at least one processor 1004 for processing. At least one processor 1004 for at least one embodiment may execute any suitable software to process digital touch input data output from touch control logic 1024. Suitable software may include, for example, any suitable driver software and/or any suitable application software. As illustrated in FIG. 10, system memory 1008 may store suitable software 1026 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation of an electronic device may include a main camera, at least one array of cameras, and a display to display an image captured by the main camera, wherein the image includes a region of interest and when the region of interest is selected, a picture in picture image of the region of interest is captured by the at least one array of cameras and displayed on the display as a picture in picture image. In an example, the image includes more than one region of interest and each region of interest is displayed in a separate picture in picture image on the display. The electronic device may also include a stream synchronization process module to capture the image and each separate picture in picture image as a separate video stream or as a single stream.

OTHER NOTES AND EXAMPLES

Example A1 is an electronic device that includes a main camera, at least one array of cameras, and a display to display an image captured by the main camera, wherein the image includes a region of interest and when the region of interest is selected, a picture in picture image of the region of interest is captured by the at least one array of cameras and displayed on the display as a picture in picture image.

In Example A2, the subject matter of Example A1 may optionally include where the image includes more than one region of interest and each region of interest is displayed in a separate picture in picture image on the display.

In Example A3, the subject matter of any of the preceding 'A' Examples can optionally include a stream synchronization process module to capture the image and each separate picture in picture image as a separate video stream.

In Example A4, the subject matter of any of the preceding 'A' Examples can optionally include a stream synchronization process module to capture the image and each separate picture in picture image as a single video stream.

In Example A5, the subject matter of any of the preceding 'A' Examples can optionally include where the display is a touch screen display and the region of interest is selected by touching the region of interest.

In Example A6, the subject matter of any of the preceding 'A' Examples can optionally include where the region of interest includes a face and the electronic device may further include a facial recognition module to track the face in the image.

In Example A7, the subject matter of any of the preceding 'A' Examples can optionally include where the region of interest includes an object and the electronic device may further include an object recognition module to track the object in the image.

In Example A8, the subject matter of any of the preceding 'A' Examples can optionally include where the electronic device is a digital camera.

Example AA1 can include a digital camera that includes a main camera, at least one array of cameras, and a display to display an image captured by the main camera, wherein the image includes more than one region of interest and each selected region of interest is displayed in a separate picture in picture image on the display over the image.

In Example AA2, the subject matter of any of the preceding 'AA' Examples can optionally include a stream synchronization process module to capture the image and each separate picture in picture image as a separate video stream.

In Example AA3, the subject matter of any of the preceding 'AA' Examples can optionally include a stream synchronization process module to capture the image and each separate picture in picture image as a single video stream.

In Example AA4, the subject matter of any of the preceding 'AA' Examples can optionally include where the display is a touch screen display and each region of interest is selected by touching each region of interest.

In Example AA5, the subject matter of any of the preceding 'AA' Examples can optionally include where a first region of interest includes a face and the electronic device may further include a facial recognition module to track the face in the image.

In Example AA6, the subject matter of any of the preceding 'AA' Examples can optionally include where a second region of interest includes an object and the electronic device may further includes an object recognition module to track the object in the image.

Example M1 is a method that includes displaying an image on a display of an electronic device, wherein the image includes more than one region of interest, and displaying a first region of interest on the display as a first picture in picture image when the first region of interest is selected, wherein the first region of interest in included in the more than one region of interest.

In Example M2, the subject matter of any of the preceding 'M' Examples can optionally include displaying a second region of interest on the display as a second picture in picture image when the second region of interest is selected, wherein the second region of interest in included in the more than one region of interest.

In Example M3, the subject matter of any of the preceding 'M' Examples can optionally include recording the image, the first picture in picture image, and the second picture in picture image as individual video streams.

In Example M4, the subject matter of any of the preceding 'M' Examples can optionally include recording the image, the first picture in picture image, and the second picture in picture image as a single video stream.

In Example M5, the subject matter of any of the preceding 'M' Examples can optionally include where the first region of interest is a face and the method further includes tracking the face using a facial recognition module as the face moves through the image.

In Example M6, the subject matter of any of the preceding 'M' Examples can optionally include where the first region of interest is an object and the method further includes tracking the object using an object recognition module as the object moves through the image.

In Example M7, the subject matter of any of the preceding 'M' Examples can optionally include determining a configuration of an electronic device using the angle value.

In Example M8, the subject matter of any of the preceding 'M' Examples can optionally include displaying the detected rotation of display portion on a display.

Example X1 is a machine-readable storage medium including machine-readable instructions to implement a method or realize an apparatus as in any one of the Examples A1-A8, AA1-AA6, M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
    a main camera;
    at least one array of cameras;
    a display to display an image captured by the main camera, wherein the image includes at least two regions of interest, wherein the display is a touch screen display and the least two regions of interest are selected by touching each of the at least two regions of interest, wherein when each of the at least two regions of interest are selected, a picture in picture image of each of the at least two regions of interest are captured by the at least one array of cameras and each of the at least two regions of interest are displayed simultaneously on the display as a separate picture in picture image; and
    a graphics processing unit to capture the image and each separate picture in picture image as separate video streams.

2. The electronic device of claim 1, wherein each of the at least two regions of interest are simultaneously displayed over the image captured by the main camera on the display.

3. The electronic device of claim 2,
wherein the graphics processing unit is also configured to capture the image and each separate picture in picture image as a single video stream.

4. The electronic device of claim 1, wherein the region of interest includes a face and the electronic device further includes:
a facial recognition circuit to track the face in the image.

5. The electronic device of claim 1, wherein the region of interest includes an object and the electronic device further includes:
an object recognition circuit to track the object in the image.

6. The electronic device of claim 1, wherein the electronic device is a digital camera.

7. A digital camera, comprising:
a main camera;
at least one array of cameras;
a touchscreen display to display an image captured by the main camera, wherein the image includes at least two regions of interest, wherein each of the at least two regions of interest can be selected by touching the region of interest on the touchscreen and when each of the at least two regions of interest are selected, each of the at least two regions of interest are captured by the at least one array of cameras 4& and each of the at least two regions of interest are displayed in a separate picture in picture image on the display over the image; and
a graphics processing unit to capture the image and each separate picture in picture image as separate video streams.

8. The digital camera of claim 7,
wherein the graphics processing unit is also configured to capture the image and each separate picture in picture image as a single video stream.

9. The digital camera of claim 7, wherein a first region of interest includes a face and the electronic device further includes:
a facial recognition circuit to track the face in the image.

10. The digital camera of claim 9, wherein a second region of interest includes an object and the electronic device further includes:
an object recognition circuit to track the object in the image.

11. A method, comprising:
displaying an image on a touchscreen display of an electronic device, wherein the image includes at least two regions of interest;
displaying a first region of interest on the display as a first picture in picture image when the first region of interest is selected, wherein the first region of interest in included in the at least two regions of interest;
displaying a second region of interest on the display as a second picture in picture image when the second region of interest is selected, wherein the second region of interest in included in the at least two regions of interest, wherein each of the first region of interest and the second region of interest are displayed simultaneously on the display as a separate picture in picture image; and
recording the image and each separate picture in picture image as separate video streams.

12. The method of claim 11, further comprising:
recording the image, the first picture in picture image, and the second picture in picture image as a single video stream.

13. The method of claim 12, wherein the first region of interest is a face and the method further comprises:
tracking the face using a facial recognition circuit as the face moves through the image.

14. The method of claim 13, wherein the second region of interest is an object and the method further comprises:
tracking the object using an object recognition circuit as the object moves through the image.

* * * * *

UNITED STATES PATENT AND TRADEMARK OFFICE
CERTIFICATE OF CORRECTION

| | | |
|---|---|---|
| PATENT NO. | : 9,736,381 B2 | Page 1 of 1 |
| APPLICATION NO. | : 14/700497 | |
| DATED | : August 15, 2017 | |
| INVENTOR(S) | : Sreenidhi A. Koti et al. | |

It is certified that error appears in the above-identified patent and that said Letters Patent is hereby corrected as shown below:

In the Claims

In Column 13, Line 25, in Claim 7, after "cameras" delete "4&".

Signed and Sealed this
Third Day of October, 2017

Joseph Matal
*Performing the Functions and Duties of the*
*Under Secretary of Commerce for Intellectual Property and*
*Director of the United States Patent and Trademark Office*